United States Patent
Gieselman et al.

(10) Patent No.: US 9,644,164 B2
(45) Date of Patent: May 9, 2017

(54) DISPERSANTS DERIVED FROM HYDROXY FATTY ACID POLYESTERS AND POLYALKYLENE GLYCOL DISPERSANTS

(71) Applicant: The Lubrizol Corporation, Wickliffe, OH (US)

(72) Inventors: Matthew D. Gieselman, Wickliffe, OH (US); Joanne L. Jones, Nottingham (GB); Renee A. Eveland, Kirtland, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 14/389,856

(22) PCT Filed: Apr. 8, 2013

(86) PCT No.: PCT/US2013/035590
§ 371 (c)(1),
(2) Date: Oct. 1, 2014

(87) PCT Pub. No.: WO2013/154978
PCT Pub. Date: Oct. 17, 2013

(65) Prior Publication Data
US 2015/0094245 A1   Apr. 2, 2015

Related U.S. Application Data

(60) Provisional application No. 61/622,748, filed on Apr. 11, 2012.

(51) Int. Cl.
| | | |
|---|---|---|
| *C10M 145/00* | (2006.01) | |
| *C10M 107/34* | (2006.01) | |
| *C10M 145/24* | (2006.01) | |
| *C10M 149/14* | (2006.01) | |
| *C10M 149/22* | (2006.01) | |
| *B01F 17/00* | (2006.01) | |

(52) U.S. Cl.
CPC ........ *C10M 107/34* (2013.01); *C10M 145/24* (2013.01); *C10M 149/14* (2013.01); *C10M 149/22* (2013.01); *B01F 17/005* (2013.01); *C10M 2207/026* (2013.01); *C10M 2207/028* (2013.01); *C10M 2209/102* (2013.01); *C10M 2215/064* (2013.01); *C10M 2215/28* (2013.01); *C10M 2217/041* (2013.01); *C10M 2219/046* (2013.01); *C10N 2220/021* (2013.01); *C10N 2230/04* (2013.01); *C10N 2240/10* (2013.01)

(58) Field of Classification Search
CPC .............. C10M 145/00; C10M 145/18; C10M 2209/10
USPC ........................................................ 508/465
See application file for complete search history.

(56) References Cited

U.S. PATENT DOCUMENTS

| | | | | |
|---|---|---|---|---|
| 6,258,761 | B1 * | 7/2001 | Lange | C08F 8/30 508/222 |
| 8,921,288 | B2 * | 12/2014 | Gieselman | C10M 133/06 508/476 |
| 2007/0026043 | A1 * | 2/2007 | Guan | A61L 31/10 424/426 |
| 2007/0027046 | A1 | 2/2007 | Friend et al. | |
| 2013/0059969 | A1 * | 3/2013 | Thetford | C09D 7/02 524/539 |
| 2015/0038385 | A1 * | 2/2015 | Barton | C10M 129/32 508/415 |

FOREIGN PATENT DOCUMENTS

| | | |
|---|---|---|
| EP | 1916290 A1 | 4/2008 |
| WO | 2007/128740 A1 | 11/2007 |

* cited by examiner

*Primary Examiner* — Ellen McAvoy
(74) *Attorney, Agent, or Firm* — Deron A. Cook; Christopher D. Hilker; Teresan W. Gilbert

(57) ABSTRACT

The disclosed invention relates to a dispersant composition comprising at least one block derived from (i) a polyester of a hydroxy substituted carboxylic acid and at least one block derived from (ii) a polyalkylene glycol terminated by a amine group or a hydroxyl group. The invention also provides lubricating compositions containing the described dispersant as well as methods of making and using the described dispersant, including method of making the dispersant, methods of lubricating an engine with a lubricant containing the described dispersant, and methods of reducing sludge formation in an engine.

14 Claims, No Drawings

US 9,644,164 B2

DISPERSANTS DERIVED FROM HYDROXY FATTY ACID POLYESTERS AND POLYALKYLENE GLYCOL DISPERSANTS

CROSS REFERENCE TO RELATED APPLICATION

This application claims priority from PCT Application Ser. No. PCT/US2013/035590 filed on Apr. 8, 2013, which claims the benefit of U.S. Provisional Application No. 61/622,748 filed on Apr. 11, 2012.

BACKGROUND OF THE INVENTION

The disclosed invention relates to a dispersant composition comprising at least one block derived from (i) a polyester of a hydroxy substituted carboxylic acid and at least one block derived from (ii) a polyalkylene glycol terminated by a amine group or a hydroxyl group. The invention also provides lubricating compositions containing the described dispersant as well as methods of making and using the described dispersant, including method of making the dispersant, methods of lubricating an engine with a lubricant containing the described dispersant, and methods of reducing sludge deposit formation and/or keeping sludge suspended such that sludge deposits will not form in an engine.

The formation of sludge in engines, and particularly the deposition of sludge on internal engine surfaces is an area of ongoing concern in the lubricant industry. Controlling sludge deposits resulting from the thermal stressing of engine oil formulations is an ongoing problem, especially when considering that engines are being designed to be more fuel efficient. Efficiency improving measures are being accomplished, for example, by driving towards smaller sump sizes, turbocharging, and implementing gasoline direct injection (GDI). These efficiency measures impart greater thermal stress to the engine oil formulations used to lubricate the engine. Greater thermal stress can lead to increased propensity to form deposits and sludge which in turn lead to efficiency losses.

Additionally, ever more restrictive emissions regulations that invariably curb the use of ash-bearing deposit controlling components (because some can poison after treatment devices) amplify the formulating challenges to build robust lubricants with low deposit propensity.

A string of publications, including U.S. Pat. No. 7,816, 309, issued Oct. 19, 2010, U.S. Pat. No. 7,820,605, issued Oct. 26, 2010, U.S. Pat. No. 7,928,044 issued Apr. 19, 2011 to Stokes et al., and U.S. Pat. No. 7,820,604 issued Oct. 26, 2010, U.S. Pat. No. 7,858,566 issued Dec. 28, 2010, U.S. Pat. No. 8,067,341 issued Nov. 29, 2011 to Ruhe Jr. et al., and U.S. 2009/0270531 published Oct. 29, 2009 to Ruhe, Jr., teach variations of compositions comprised of at least the reaction product of (A) at least one copolymer obtained by free radical copolymerization, and (B) at least one amine terminated ether compound, along with optional further compounds.

There is a need for new dispersant technology that better controls the deposition of sludge on engine surfaces, that is the formation of sludge deposits on engine surfaces, in view of the changing engine designs and operating conditions, as well as ever more restrictive emissions regulations.

SUMMARY OF THE INVENTION

The inventors have now discovered dispersant compositions with improved performance properties.

The invention provides a dispersant additive wherein the structure of the additive includes at least one block derived from (i) a polyester of a hydroxy substituted carboxylic acid and at least one block derived from (ii) a polyalkylene glycol terminated by a amine group or a hydroxyl group. In some embodiments the dispersant additive structure includes at least two separate polyester-based blocks made up of one or more segments derived from (i) the polyester of a hydroxy substituted carboxylic acid, where the polyester-based blocks separated by at least one glycol-based block made up of one or more segments derived from (ii) the polyalkylene glycol terminated by a amine group or a hydroxyl group.

The invention also provides for a lubricating composition that includes an oil of lubricating viscosity and the described dispersant.

The invention also provides for a method of making a dispersant additive that includes the steps of reacting: (i) a polyester of a hydroxy substituted carboxylic acid, a hydroxy substituted carboxylic acid, or a combination thereof, with (ii) a polyalkylene glycol terminated by a amine group or a hydroxyl group, an alkylene oxide, or a combination thereof; resulting in a dispersant additive whose structure includes at least one segment derived from component (i) and at least one segment derived from component (ii).

The invention includes a method of making a dispersant additive that includes the steps of reacting: (i) a polyester of a hydroxy substituted carboxylic acid with (ii) a polyalkylene glycol terminated by a amine group or a hydroxyl group; resulting in a dispersant additive whose structure includes at least one segment derived from component (i) and at least one segment derived from component (ii). The further invention includes a method of making a dispersant additive that includes the steps of reacting: (i) a hydroxy substituted carboxylic acid with (ii) a polyalkylene glycol terminated by a amine group or a hydroxyl group; resulting in a dispersant additive whose structure includes at least one segment derived from component (i) and at least one segment derived from component (ii). In other words, the hydroxyl substituted carboxylic acid can be reacted with the polalkylene glycol and then the polymerization of the hydroxyl substituted carboxylic acid occurs. The invention still further includes a method of making a dispersant additive that includes the steps of reacting: (i) a polyester of a hydroxy substituted carboxylic acid with (ii) an alkylene oxide; resulting in a dispersant additive whose structure includes at least one segment derived from component (i) and at least one segment derived from component (ii).

The invention also provides a method of lubricating an engine including the step of supply a lubricating composition to the engine, wherein the lubricating composition includes an oil of lubricating viscosity and the described.

The invention also provides a method of dispersing sludge, which effectively reduces the formation of sludge deposits on the internal surfaces of an engine, by supplying a lubricating composition to the engine, wherein the lubricating composition includes an oil of lubricating viscosity and the described dispersant. Also included is the use of the described dispersant as a sludge deposit reduction additive or perhaps more accurately as an additive that disperses sludge and so thereby reduces sludge deposits.

In further embodiments, there is provided a method of improving sludge deposit performance in an engine, or improving seal performance in an engine, comprising applying to the engine the described dispersant or lubricant composition containing the described dispersant. In still further embodiments, there is provided a method of improving nitration and oxidation performance in an engine oil, and maintaining TBN in an engine oil, comprising applying to the engine the described dispersant or lubricant composition containing the described dispersant.

DETAILED DESCRIPTION OF THE INVENTION

Various preferred features and embodiments will be described below by way of non-limiting illustration.

The present invention provides a dispersant additive wherein the structure of the additive includes at least one block derived from (i) a polyester of a hydroxy substituted carboxylic acid and at least one block derived from (ii) a polyalkylene glycol terminated by a amine group or a hydroxyl group.

The Polyester

The structure of the described dispersant includes at least one block derived from (i) a polyester of a hydroxy substituted carboxylic acid.

Suitable polyesters include those derived from hydroxy substituted carboxylic acids containing from 1 to 30 or from 2 to 30 carbon atoms. In some embodiments the polyesters are derived from hydroxy substituted carboxylic acids containing from 1 to 20 or from 2 to 20, 10 to 18, 12 to 18, or even 16 to 18 carbon atoms.

In some embodiments the polyester of a hydroxy substituted carboxylic acid is derived from one or more carboxylic acids of formula (I):

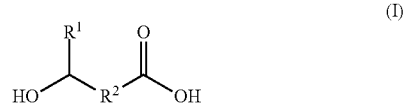

where $R^1$ is a hydrogen or a hydrocarbyl group containing from 1 to 20 carbon atoms and $R^2$ is a hydrocarbylene group containing from 1 to 20 carbon atoms.

In some embodiments the polyester of a hydroxy substituted carboxylic acid comprises one or more compounds represented by formula (II):

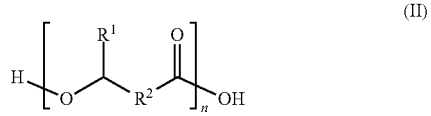

where $R^1$ is hydrogen or a hydrocarbyl group containing from 1 to 20 carbon atoms, or from 1 to 18, 2 to 14, 2 to 10, 4 to 8 or even 6 carbon atoms; $R^2$ is a hydrocarbylene group containing from 1 to 20 carbon atoms, or from 2 to 18, 6 to 16, 8 to 14, 8 to 12 or even 10 carbon atoms; and n is an integer from 1 to 10, or from 2 to 8, 3 to 7, 4 to 6 or even 5 to 6.

Examples of suitable carboxylic acid polyesters include those derived from unsaturated or saturated acids. In some embodiments the acids are saturated. In some embodiments the acids are unsaturated. Examples of suitable carboxylic acid polyesters include those derived from 12-hydroxystearic acid, ricinoleic acid, 12-hydroxy dodecanoic acid, 5-hydroxy dodecanoic acid, 5-hydroxy decanoic acid, 4-hydroxy decanoic acid, 10-hydroxy undecanoic acid, or combinations thereof. In some embodiments the carboxylic acid polyester is 12-hydroxystearic acid or ricinoleic acid. In some embodiments the carboxylic acid polyester is 12-hydroxystearic.

The Polyalkylene Glycol

The structure of the described dispersant includes at least one block derived from (ii) a polyalkylene glycol terminated by an amine group or a hydroxyl group. These materials may also be referred to as polyethers.

In one embodiment, the polyether can have a Mn of between about 100 and 1500, and in another embodiment, the polyether can have a Mn of between about 200 and 1200, or 300 and 1000. In certain embodiments, the polyether can have an Mn of between about 600 and 900.

In one embodiment of the invention, the hydroxyl terminated and amine terminated polyethers comprise compounds of formula (III):

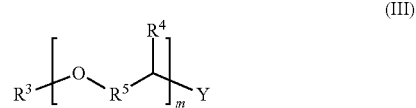

wherein: $R_3$ can be hydrogen (H), $-R_6OH$, $-R_6NH_2$, $-(C=O)R_6$, $-R_6-N(H)C(=O)R_6$, or a hydrocarbyl group of from 1 to 30 carbon atoms, or 1 to 20, or 1 to 10 carbon atoms, and in some embodiments 1 to 6, or 1 to 4, or 1 or 2 carbon atoms, and preferably $R_3$ can be H or a methyl group; $R_4$ can be H, or a hydrocarbyl group of from 1 to 10 carbon atoms, or 1 to 8, or 1 to 6 carbon atoms, and preferably $R_4$ can be H or a methyl group, i.e. a single carbon hydrocarbyl group; $R_5$ can be a straight or branched hydrocarbyl group of from 1 to 6 carbon atoms, or 1 to 4, or 1 or 2 carbon atoms, or even 1 carbon atom, and preferably $R_5$ can be a methylene group; $R_6$ can be a hydrocarbyl group of 1 to 20 carbon atoms, or 1 to 10 carbon atoms and in some embodiments 1 to 6, or 1 to 4, or 1 or 2 carbon atoms, and preferably $R_6$ can be $CH_2CH(CH_3)$; Y can be $NR_7R_8$ or OH, and in certain embodiments Y can be $-R_6NH_2$ or $-R_6OH$, and preferably Y can be $NH_2$ or OH, where $R_7$ and $R_8$, each independently, can be H, or a hydrocarbyl group of from 1 to 50 carbon atoms in which up to one third of the carbon atoms can be substituted by N or functionalized with additional polyether of formula (III); and m can be an integer from 1 to 30, or from 2 to 20, or 3 to 10, and more preferably 3 to 7.

In some embodiments the hydroxyl terminated and amine terminated polyethers used in the invention comprise compounds represented by formula (III) where $R^5$ is a methylene group and all other variables are defined as above.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character.

Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; alternatively, there may be no non-hydrocarbon substituents in the hydrocarbyl group.

In certain embodiments, the polyether of formula (III) can be an amine terminated polyether of between about 600 and 1200 Mn, that is, where Y is $NH_2$. In such embodiments, $R_3$ can preferably be, for example, methyl or $CH_2CH(CH_3)NH_2$. Similarly, $R_4$ can preferably be H or methyl, and preferably $R_5$ can be methylene. Preferred values for m can be between 3 and 22, or 10 to 20. In certain embodiments of the amine terminated polyether, m can be about 3 or 4, or about 10 to 13, preferably 10 or 12 to 13, and in other embodiments from about 18 to 22, preferably 18 to 19 or 22.

In certain other embodiments, the polyether can be a hydroxyl terminated polyether of between about 100 and 600 Mn, that is, where Y is OH. In such embodiments, $R_3$ can be, for example, H or methyl, more preferably H. Similarly, $R_4$ is preferably H and $R_5$ is preferably methylene. Preferred values for m can be between 2 and 13, or 5 to 10. In certain embodiments of the hydroxyl terminated polyether, m can be 2 or 3, or about 6 to 7 or 7, or about 13.

In one embodiment, when $R_4$ is an alkyl, $R_5$ is a linear alkyl, preferably methylene. Likewise, in some embodiments when $R_5$ is a branched alkyl, $R_4$ is H.

It is to be understood that the polyethers encompassed by the above formulas can have different end groups from the repeat unit of formula (III). The end groups, for example, may be slightly altered depending on the method of initiation of the polyether. However, the end groups will themselves be encompassed by formula (III). Thus, the polyethers contemplated herein can include repeat units of formula (III) and combinations of variations of formula (III). For example, as in formula (IV):

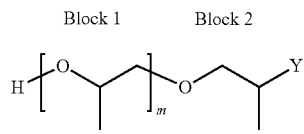

(IV)

where Y is OH. Notably, both block 1 and block 2 are encompassed by formula (III). In block 1, $R_5$ is a branched alkyl, and $R_4$ is H, whereas in block 2, $R_5$ is methylene and $R_4$ is methyl, so that the formula is a combination of variations of formula (III).

In another example, formula (III) can encompass the block polyether directly following:

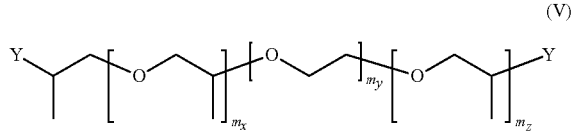

(V)

where, as compared to formula (III), $R_5$ is methylene, $R_4$ is either methyl or H, Y is preferably $NH_2$ and $m_x$, $m_y$, and $m_z$ designate the respective blocks.

An example hydrocarbyl group of from 1 to 20 carbon atoms, i.e. $R_6$, can include an aryl, aliphatic, cycloaliphatic, linear or branched hydrocarbyl. In one embodiment, $R_6$ can be represented by formula (VI):

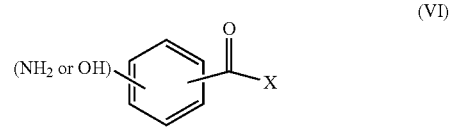

(VI)

where x can be from 1 to 10 carbon atoms. In one embodiment, $NH_2$ or OH can be added to the ring to form $R_3$.

An example hydrocarbyl group of formula (III) having from 1 to 50 carbon atoms in which up to one third of the carbon atoms can be substituted by N can encompass, for example, an amine having at least 4 aromatic groups, at least one $NH_2$ functional group, and at least 2 secondary or tertiary amino groups, for example, represented by formula (VII).

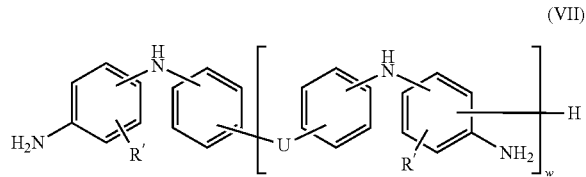

(VII)

wherein independently each variable, R' can be H or $R_5$; U can be an aliphatic, alicyclic or aromatic group, with the proviso that when U is aliphatic, the aliphatic group may be a linear or branched alkylene group containing 1 to 5, or 1 to 2 carbon atoms; and w may be 1 to 10, or 1 to 4, or 1 to 2 (typically 1).

Further examples of hydrocarbyl groups as shown in Formula A can be found as described in paragraphs [0030] to [0038] of U.S. Publication #2011/0306528, to Gieselman et al., published Dec. 15, 2011.

An example hydrocarbyl group of formula (III) having from 1 to 50 carbon atoms in which up to one third of the carbon atoms can be substituted by N can also encompass, for example, Duomeen™, such as materials of formula (VIII):

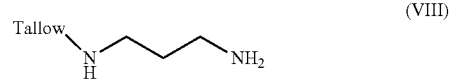

(VIII)

According to the polyether of formula (III), a hydrocarbyl group having from 1 to 50 carbon atoms in which up to one third of the carbon atoms can be substituted by N, can also be functionalized with additional polyether of formula (III). An example of such functionalization can be seen in the compound represented by formula (IX) where $m_1+m_2+m_3+m_4+m_5+m_6$ can be 10 or 20, or by formula (X) wherein $m_1+m_2+m_3$ is 3, 10, or 15.

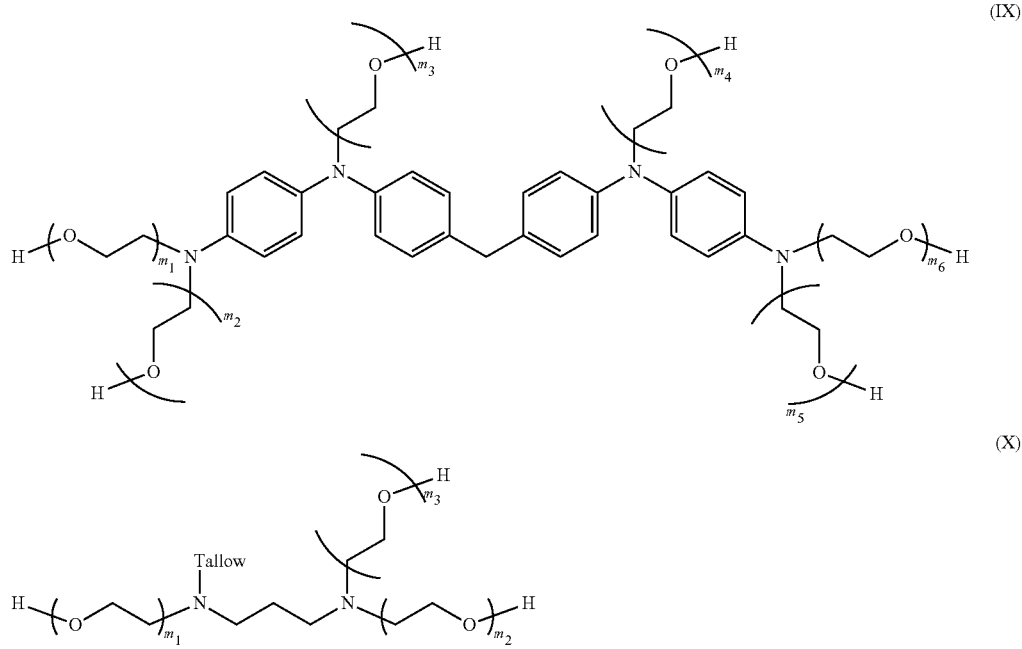

(IX)

(X)

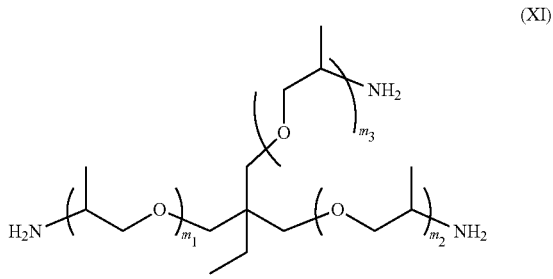

wherein each m individually can be 0, 1, 2, 3, 4 or 5 and where $m_1+m_2+m_3$ can be between 2 and 15, or between 3 and 12, or between 4 and 10, and in certain embodiments the total of $m_1+m_2+m_3$ can be 3, or 10, or 15.

A still further example can be seen in the following formula;

(XI)

wherein each m individually can be 0, 1, 2, 3, 4 or 5, and where $m_1+m_2+m_3$ can be between 2 and 10, or between 3 and 9, or between 4 and 8, and in certain embodiments where the total of $m_1+m_2+m_3$ can be 5 or 6.

In some embodiments the polyether of the invention comprises compounds represented by formula (I) and/or formula (II) and/or formula (III) and/or formula (IV) and/or formula (V). In some embodiments the polyether of the is essentially free of, or even completely free of, compounds represented by formula (VIII) and/or formula (IX) and/or formula (X).

The Dispersant

As noted above, the dispersant has a structure that includes at least one block derived from (i) a polyester of a hydroxy substituted carboxylic acid and at least one block derived from (ii) a polyalkylene glycol terminated by an amine group or a hydroxyl group.

The polyester and the amine or hydroxyl terminated polyether can be reacted at elevated temperature to form the dispersant composition. Typically, the reaction of the polyester and hydroxyl terminated polyether can require an acid catalyst to achieve greater conversion.

In some embodiments the dispersant additive structure may be described as including at least two separate polyester-based blocks made up of one or more segments derived from (i) the polyester of a hydroxy substituted carboxylic acid, where the polyester-based blocks separated by at least one glycol-based block made up of one or more segments derived from (ii) the polyalkylene glycol terminated by a amine group or a hydroxyl group.

In some embodiments the dispersant is formed by reacting (i) a polyester of a hydroxy substituted carboxylic acid and (ii) a polyalkylene glycol terminated by an amine group or a hydroxyl group. In some embodiments the dispersant is formed by reacting (i) a hydroxy substituted carboxylic acid with (ii) a polyalkylene glycol terminated by a amine group or a hydroxyl group followed by polymerization of the hydroxyl substituted carboxylic acid. In some embodiments the dispersant is formed by reacting (i) a polyester of a hydroxy substituted carboxylic acid with (ii) an alkylene oxide. In any of these described routes, the result is a dispersant additive whose structure includes at least one segment derived from component (i) and at least one segment derived from component (ii).

The dispersant of the invention may be formed by a reaction wherein the molar ratio of the units of the polyester of a hydroxy substituted carboxylic acid relative to the molecules of the polyalkylene glycol terminated by a amine group or a hydroxyl group, regardless of which route is used, may be from 1:1 to 15:1, or from 2:1 to 12:1, or from 1:1 to 3:1 or from 10:1 to 14:1, or even above 2:1 or about 12:1. In some embodiments the dispersant of the invention may be formed by reacting a hydroxy substituted carboxylic acid with a polyalkylene glycol terminated by a amine group or a hydroxyl group, thus forming the dispersant by adding hydroxy substituted carboxylic acid units to one or more ends of the polyalkylene glycol terminated by a amine group or a hydroxyl group and in these embodiments the molar ratio of the reactions, that is the ratio of hydroxy substituted carboxylic acid units to molecules of polyalkylene glycol, may be from 10:1 to 14:1 or from 11:1 to 13:1, or even about 11.5:1 to 12.5:1, or even about 12:1. In some embodiments the dispersant of the invention may be formed by reacting a polymerized polyester of hydroxy substituted carboxylic acid with a polyalkylene glycol terminated by a amine group or a hydroxyl group, thus forming the dispersant by adding the polyester, derived from the hydroxy substituted carboxylic acid, to one or more ends of the polyalkylene glycol terminated by a amine group or a hydroxyl group and in these embodiments the molar ratio of the reactions, that is the ratio of the molecules of polyester to molecules of polyalkylene glycol, may be from 1:1 to 4:1 or from 1:1 to 3:1, or even about 1.5:1 to 2.5:1, or even about 2:1. In some embodiments the resulting dispersant contains 10 to 14, or even about 12, hydroxyl substituted carboxylic acid units, with 5 to 7, or even about 6, hydroxyl carboxylic acid units present on each end of the polyalkylene glycol, forming two blocks of polyester units, one on each end of the polyalkylene glycol.

In some embodiments the dispersant includes the reaction product of a polyester of a hydroxy substituted carboxylic acid derived from 12-hydroxystearic acid and a polyalkylene glycol selected from the group consisting of (i) triethylene glycol, (ii) diethylene glycol, (iii) a 250 to 350 molecular weight polyethylene glycol, (iv) a 200 to 350 molecular weight polytetrahydrofuran, (v) a mixture of one or more amine terminated glycols containing units derived from ethylene oxides, propylene oxides, butylene oxides, or some combination thereof, or (vi) some combination thereof.

In some embodiments the polyester and the polyether can be reacted at elevated temperature to form the described dispersant composition. This reaction of the polyester and the polyether can be carried out with an acid catalyst to achieve greater conversion. In other embodiments no catalyst is used. In some embodiments, prior to reaction with the polyester, the polyether can be reacted with an acid or anhydride, such as anthranilic acid or isatoic anhydride. In other embodiments the polyether is not modified in this way.

In still other embodiments the described dispersant can be further reacted with an amine, such as a polyamine, for example an aliphatic polyamine. The amine may be an aliphatic polyamine such as ethylene polyamine (i.e., a polyethylene polyamine), a propylene polyamine, a butylene polyamine, or a mixture of two or more thereof. The aliphatic polyamine may be ethylene polyamine. The aliphatic polyamine may be selected from ethylenediamine, diethylenetriamine, triethylenetetramine, tetraethylenepentamine, pentaethylenehexamine, polyamine still bottoms, or a mixture of two or more thereof. These polyamine may be reacted with the described dispersant in a molar ratio of from about 4:1 to 1:4, or from about 2:1 to 1:2, or from about 1.5:1 to 1:1.5, or from about 1.1:1 to 1:1.1, or even at about 1:1. In other embodiments the dispersant is not post-treated by reacting it with an amine.

Lubricant Compositions

In another aspect of the invention, the dispersant composition described can be incorporated in a lubricant composition with an oil of lubricating viscosity and optional other performance additives.

In one embodiment, the dispersant composition described herein may be added to an oil of lubricating viscosity in a range of 0.01 wt % to 20 wt %, or 0.05 wt % to 10 wt %, or 0.08 wt % to 5 wt %, or 0.1 wt % to 3 wt % of the lubricating composition.

Oils of lubricating viscosity can include, for example, natural and synthetic oils, oil derived from hydrocracking, hydrogenation, and hydrofinishing, unrefined, refined and re-refined oils and mixtures thereof. Oils of lubricating viscosity may also be defined as specified in the American Petroleum Institute (API) Base Oil Interchangeability Guidelines.

A more thorough elaboration of the various oils that can be employed in the present invention can be found in paragraphs [0104] to [0111] of U.S. Publication #2011/0306528, to Gieselman et al., published Dec. 15, 2011.

The lubricant composition may be in the form of a concentrate and/or a fully formulated lubricant. If the polymer of the present invention is in the form of a concentrate (which may be combined with additional oil to form, in whole or in part, a finished lubricant), the weight ratio of the polymer to the oil of lubricating viscosity and/or to diluent oil include the ranges of 1:99 to 99:1 by weight, or 80:20 to 10:90 by weight.

The composition can optionally comprise other performance additives as well. The other performance additives can comprise at least one of metal deactivators, conventional detergents (detergents prepared by processes known in the art), dispersants, viscosity modifiers, friction modifiers, antiwear agents, corrosion inhibitors, dispersant viscosity modifiers, extreme pressure agents, antiscuffing agents, antioxidants, foam inhibitors, demulsifiers, pour point depressants, seal swelling agents and mixtures thereof. Typically, fully-formulated lubricating oil will contain one or more of these performance additives.

In particular, further dispersants may be employed in a lubricant composition with the dispersant composition. Dispersants are often known as ashless-type dispersants because, prior to mixing in a lubricating oil composition, they do not contain ash-forming metals and they do not normally contribute any ash forming metals when added to a lubricant and polymeric dispersants. Ashless type dispersants are characterized by a polar group attached to a relatively high molecular weight hydrocarbon chain. Typical ashless dispersants include N-substituted long chain alkenyl succinimides. Examples of N-substituted long chain alkenyl succinimides include PIB succinimide with number average molecular weight of the PIB substituent in the range 350 to 5000, or 500 to 3000. Succinimide dispersants and their preparation are disclosed, for instance in U.S. Pat. No. 4,234,435. Succinimide dispersants are typically the imide formed from a polyamine, typically a polyethylene polyamine or an aromatic polyamine, such as amino diphenylamine (ADPA).

In one embodiment, the lubricant composition can further comprise the reaction product of a PIB succinic anhydride and an amine, preferably a polyamine, and preferably an aliphatic polyamine, such as ethylene polyamine (i.e., a polyethylene polyamine), a propylene polyamine, a butylene polyamine, or a mixture of two or more thereof. The aliphatic polyamine may be ethylene polyamine. The aliphatic polyamine may be selected from ethylenediamine, diethylenetriamine, triethylenetetramine, tetraethylenepentamine, pentaethylenehexamine, polyamine still bottoms, or a mixture of two or more thereof.

In one embodiment the lubricant composition further comprises at least one PIB succinimide dispersant derived from PIB with number average molecular weight in the range 350 to 5000, or 500 to 3000. The PIB succinimide may be used alone or in combination with other dispersants.

Another class of ashless dispersant is Mannich bases. Mannich dispersants are the reaction products of alkyl phenols with aldehydes (especially formaldehyde) and amines (especially polyalkylene polyamines). The alkyl group typically contains at least 30 carbon atoms.

The dispersants may also be post-treated by conventional methods by a reaction with any of a variety of agents. Among these are boron, urea, thiourea, dimercaptothiadiazoles, carbon disulfide, aldehydes, ketones, carboxylic acids, hydrocarbon-substituted succinic anhydrides, maleic anhydride, nitriles, epoxides, phosphorus compounds and/or metal compounds.

The dispersant may be present at 0 wt % to 20 wt %, or 0.1 wt % to 15 wt %, or 0.1 wt % to 10 wt %, or 1 wt % to 6 wt %, or 7 wt % to 12 wt % of the lubricating composition.

In some embodiments the lubricant compositions of the invention may also comprise an antioxidant, for example an ashless antioxidant. Suitable examples include hindered phenols, diaryl amines, sulfurized olefins, and combinations thereof.

In some embodiments the lubricant compositions of the invention include the dispersant additive derived from (i) a polyester and (ii) a polyalkylene glycol, described above, in combination with a mixtures of optional performance additives which may include one or more additional dispersants, for example an ashless nitrogen-continuing ashless dispersant such as a succinimide dispersant, and one or more ashless antioxidants, such as a hindered phenol, diaryl amine, or sulfurized olefin.

The total combined amount of the optional performance additives present in one embodiment from 0 or 0.01 wt. % to 50 wt. %, in another embodiment 0 or 0.01 to 40 wt. %, in another embodiment 0 or 0.01 to 30 wt. % and in another embodiment 0.05 or 0.1 or 0.5 to 20 wt. % of the lubricating composition. In one embodiment, the total combined amount of the additional performance additive compounds present on an oil free basis ranges from 0 wt % to 25 wt % or 0.01 wt to 20 wt % of the composition. Although, one or more of the other performance additives may be present, it is common for the other performance additives to be present in different amounts relative to each other.

INDUSTRIAL APPLICATION

The described lubricating composition may be utilized in an internal combustion engine. The internal combustion engine may or may not have an Exhaust Gas Recirculation system.

In one embodiment the internal combustion engine may be a diesel fuelled engine (typically a heavy duty diesel engine), a gasoline fuelled engine, a natural gas fuelled engine or a mixed gasoline/alcohol fuelled engine. In one embodiment the internal combustion engine may be a diesel fuelled engine and in another embodiment a gasoline fuelled engine. In one embodiment the present invention is used with a spark-ignited engine.

The internal combustion engine may be a 2-stroke or 4-stroke engine. Suitable internal combustion engines include marine diesel engines, aviation piston engines, low-load diesel engines, and automobile and truck engines. Hybrid engines, that is, internal combustion engines used in combination with electric motors or similar alternatives, are also contemplated in the invention.

The lubricant composition for an internal combustion engine may be suitable for any engine lubricant irrespective of the sulfur, phosphorus or sulfated ash (ASTM D-874) content. The sulfur content of the engine oil lubricant may be 1 wt % or less, or 0.8 wt % or less, or 0.5 wt % or less, or 0.3 wt % or less. In one embodiments the sulfur content may be in the range of 0.001 wt % to 0.5 wt %, or 0.01 wt % to 0.3 wt %. The phosphorus content may be 0.2 wt % or less, or 0.1 wt % or less, or 0.085 wt % or less, or even 0.06 wt % or less, 0.055 wt % or less, or 0.05 wt % or less. In one embodiment the phosphorus content may be 100 ppm to 1000 ppm, or 325 ppm to 700 ppm. The total sulfated ash content may be 2 wt % or less, or 1.5 wt % or less, or 1.1 wt % or less, or 1 wt % or less, or 0.8 wt % or less, or 0.5 wt % or less. In one embodiment the sulfated ash content may be 0.05 wt % to 0.9 wt %, or 0.1 wt % to 0.2 wt % to 0.45 wt %.

In one embodiment the lubricating composition is an engine oil, wherein the lubricating composition is characterized as having at least one of (i) a sulfur content of 0.5 wt % or less, (ii) a phosphorus content of 0.1 wt % or less, and (iii) a sulfated ash content of 1.5 wt % or less.

The dispersant composition and the lubricating compositions containing the dispersant composition can in some embodiments be employed in a method of improving one of deposit performance and seal performance in an engine by applying the dispersant composition or lubricating composition containing the dispersant composition to the engine.

The dispersant composition and the lubricating compositions containing the dispersant composition also can in some embodiments be employed in a method of improving nitration and oxidation performance and maintaining TBN in an engine oil, by applying to the engine oil the dispersant composition or the lubricating compositions containing the dispersant composition. An additional amount of the reaction product of a PIB succinic anhydride and an amine, preferably an aliphatic amine, and preferably an aliphatic polyamine, such as, for example, polyethyleneamine (PEPA), may be employed in the method.

Overbased detergents are often characterized by Total Base Number (TBN). TBN is the amount of strong acid needed to neutralize all of the over-based material's basicity, expressed as potassium hydroxide (mg KOH per gram of sample). Since overbased detergents are commonly provided in a form which contains a certain amount of diluent oil, for example, 40-50% oil, the actual TBN value for such a detergent will depend on the amount of such diluent oil present, irrespective of the "inherent" basicity of the over-based material. For the purposes of the present invention, the TBN of an overbased detergent is to be recalculated to an oil-free basis. Detergents which are useful in the present technology may typically have a TBN (oil-free basis) of 100 to 800, and in one embodiment 150 to 750, and in another, 400 to 700. If multiple detergents are employed, the overall TBN of the detergent component (that is, an average of all the specific detergents together) will typically be in the above ranges, and the required contribution to the TBN of the metal-containing detergent component will be the total of the contributions of each individual detergent.

The overall TBN of the composition, including oil, will be derived from the TBN contribution of the individual components, such as the dispersant, the detergent, and other basic materials. The overall TBN will, in some embodiments, be at least 4 or at least 6, or sometimes even at least 8. The amount of TBN provided by the metal-containing detergent will be at least 1, or at least 2, or at least 4, or at least 6, and the amount of the metal containing detergent or detergents will typically be an amount suitable to provide such TBN levels. In certain embodiments, the actual amount of the metal-containing detergent (or detergents) may be 0.2 to 5 percent by weight or 0.3 to 3 percent or 0.5 to 2 percent or 0.9 to 1.5 percent by weight. The skilled person will recognize that, if a metal-containing detergent is used at 0.2 percent by weight and it is to contribute at least 2 TBN to the formulation, then that detergent itself must have a TBN of at least 1000 (amounts and TBN values expressed on oil-free basis).

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: (i) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); (ii) substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); (iii) hetero substituents, that is, substituents which, while having a predominantly hydrocarbon character, in the context of this invention, contain other than carbon in a ring or chain otherwise composed of carbon atoms and encompass substituents as pyridyl, furyl, thienyl and imidazolyl. Heteroatoms include sulfur, oxygen, and nitrogen. In general, no more than two, or no more than one, non-hydrocarbon substituent will be present for every ten carbon atoms in the hydrocarbyl group; alternatively, there may be no non-hydrocarbon substituents in the hydrocarbyl group.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which set forth particularly advantageous embodiments. While the examples are provided to illustrate the invention, they are not intended to limit it.

Example 1

A polyhydroxystearic acid (PHSA) is prepared by adding 12-hydroxystearic acid (HSA) to a jacketed reaction vessel fitted with a stirrer, a Dean-Stark trap, a subsurface nitrogen line, and a thermocouple controller system. The reaction is heated to 100° C. and zirconium butoxide (0.57 wt %) is added. The reaction mixture is heated to 195° C. and held at that temperature with agitation for 12 hours. The reaction product is cooled and collected.

Example 2

A triethyleneglycol-polyhydroxystearic (TEG-PHSA) polyester is prepared by adding HSA (1209 g) to a 3 L flask fitted with a stirrer, a Dean-Stark trap, a thermocouple and nitrogen inlet valve. The material is warmed slowly to 85° C. then warmed to 110° C. with agitation and nitrogen purge. The triethylene glycol (TEG) (50.56 g), is then added via addition funnel over 15 minutes. The mixture is heated to 150° C. and is then stirred for 4 hours. Zirconium butoxide (7.2 g, 80% solution) is added and the reaction is heated to 195° C. and stirred for 22 hours. The reaction is cooled to yield the desired TEG-PHSA polyester product (1156 g).

Example 3

A triethyleneglycol-polyhydroxystearic (TEG-PHSA) polyester is prepared by adding the product of Example 1 (1218 g) to a 3 L task equipped with a Dean-Stark trap, a stirrer, a thermocouple, and a nitrogen inlet valve. The material is heated to 100° C. with stirring and nitrogen purge. TEG (57 g) is added via a dropping funnel over 10 minutes. Zirconium butoxide (7.33 g) is added and the reaction is heated to 195° C. over 50 minutes and then is stirred for 24 hours. The reaction is cooled to yield the desired TEG-PHSA polyester product (1257 g).

Example 4

A diethyleneglycol-polyhydroxystearic (DEG-PHSA) polyester is prepared by following the procedure of Example 3 except that diethyleneglycol (DEG) (41 g) is added instead of TEG with the PHSA (1236 g) of Example 1. The reaction yields the desired DEG-PHSA polyester product (1254 g).

Example 5

A polyethyleneglycol-polyhydroxystearic (PEG-PHSA) polyester is prepared by following the procedure of Example 3 except that a 300 number average molecular weight polyethyleneglycol (PEG) (115 g) is added instead of TEG with the PHSA (583 g) of Example 1. The reaction yields the desired PEG-PHSA polyester product (1320 g).

Example 6

A polytetrahydrofuran-polyhydroxystearic (PTHF-PHSA) polyester is prepared by following the procedure of Example 3 except that 3 to 4 repeating unit (about 200 to 300 number average molecule weight) polytetrahydrofuran (PTHF) (94 g) is added instead of TEG with the PHSA (1205 g) of Example 1. The reaction yields the desired PTHF-PHSA polyester product (1236 g).

Example 7

A polyoxyalkyleneamine-polyhydroxystearic (POAA-PHSA) polyester is prepared by adding HSA (1215 g) to a 3 L flask equipped with a stirrer, a thermocouple and a nitrogen inlet. The material is melted at 90° C. and then heated to 110° C. with stirring and nitrogen purge. A polyoxyalkyleneamine, in this case Jeffamine® HK511 (available from Huntsman, 80.4 g) is added via a dropping funnel over 20 minutes. The mixture is heated to 155° C. for 4.5 hours with stirring. The reaction is then cooled to 100° C. and zirconium butoxide (7.4 g) is added. The reaction is then heated to 150° C. and stirred for 24 hours. The reaction yields the desired POAA-PHSA polyester product (1015 g).

Example 8

A polypropyleneglycol-polyhydroxystearic (PPG-PHSA) polyester is prepared by following the procedure of Example 3 except that a 425 number average molecular weight polypropyleneglycol (PPG) (161 g) is added instead of TEG with the PHSA (1214 g) of Example 1. The reaction yields the desired PPG-PHSA polyester product (1355 g).

Example 9

A polyoxyalkyleneamine-polyhydroxystearic (POAA-PHSA) polyester is prepared by adding the product of Example 1 (1044 g) to a 3 L flask equipped with a stirrer, a thermocouple, a Dean-Stark trap, and a nitrogen inlet. The material is heated to 100° C. and a polyoxyalkyleneamine, in this case Jeffamine® HK511 (78 g), is added via a dropping funnel over 15 minutes. The mixture is heated to 155° C. and stirred for 6 hours and then to 180° C. and then stirred for about 5 hours and is then cooled. The reaction yields the desired POAA-PHSA polyester product (1089 g).

Example Set A

Several of the examples described above are blended into an ACEA 2010 A3/B4 10W-40 lubricating oil. Table 1 summarizes the blends of this example set. Comparative Example A-1 is a baseline with no experimental composition added. Each example here contains an additive package that includes: 1% of an antioxidant (AO) system consisting of ashless aminic and phenolic antioxidants; 1.77% of a detergent system is present consisting of calcium sulfonate and phenate; a standard amount of zinc-containing antiwear agent and friction modifier; and 5.1% succinimide dispersant. The indicated polyester dispersant example is added to each example as a 3% top treat. All percent values here are weight percent values based on the overall lubricating composition and all treat rates in the table are actives treat rates reported on a an oil-free basis.

The compositions in Table 1 are analyzed in a sludge dispersing screen test where the oil to be tested (43.8 g) is stressed with 1.5 mL of 6N nitric acid and 0.5 mL of 0.5% iron napthenate catalyst for 4 hours at 60° C. Then the sample is further stressed at elevated temperature (145° C.) while purging the sample with 5% NOx in air. The purpose of the stressing procedure is to mimic conditions under which sludge forms in a crankcase.

Periodically, samples of the stressed oil are blotted onto chromatography paper and developed at 60° C. for 24 hours. The oil spreads out on the paper through capillary action and consists of an outer oil ring and an inner sludge ring. The ratio of the area of the inner ring to the area of the outer ring is measured and a higher ratio indicates improved sludge dispersancy. The number of hours for this ratio to fall below 0.5 is measured and reported with a higher number of hours to fail indicating relatively more robust sludge dispersancy. Table 1 also shows the hours to fail for the examples of set A.

TABLE 1

Example Set A Formulations and Results

| | Ex A-1 | Ex A-2 | Ex A-3 | Ex A-4 | Ex A-5 | Ex A-6 | Ex A-7 | Ex A-8 | Ex A-9 |
|---|---|---|---|---|---|---|---|---|---|
| 10W-40 Oil | 90.0 | 87.0 | 87.0 | 87.0 | 87.0 | 87.0 | 87.0 | 87.0 | 87.0 |
| Additive Package | 10.0 | 10.0 | 10.0 | 10.0 | 10.0 | 10.0 | 10.0 | 10.0 | 10.0 |
| Ex 1 | | | | | | | | | |
| Ex 2 | | 3.0 | | | | | | | |
| Ex 3 | | | 3.0 | | | | | | |
| Ex 4 | | | | 3.0 | | | | | |
| Ex 5 | | | | | 3.0 | | | | |
| Ex 6 | | | | | | 3.0 | | | |
| Ex 7 | | | | | | | 3.0 | | |
| Ex 8 | | | | | | | | 3.0 | |
| Ex 9 | | | | | | | | | 3.0 |
| Hours to Fail in Sludge Test | 161 | 184 | 187 | 185 | 192 | 175 | 180 | 183 | 183 |

The results shows that Example A-1, which does not contain a one of the polyester dispersants of the invention, reaches less than a 0.5 spot ratio (or in other words fails) at 161 hours. All of the examples containing the polyester dispersants of the invention reach their fail point at 175-192 hours indicating improved sludge dispersancy.

Each of the documents referred to above is incorporated herein by reference. The mention of any document is not an admission that such document qualifies as prior art or constitutes the general knowledge of the skilled person in any jurisdiction. Except in the examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All percent values, concentrations, and/or ratios included herein, unless otherwise indicated, are provided on a weight basis.

What is claimed is:

1. A lubricating composition comprising a dispersant additive wherein the structure of the additive comprises at least one block derived from (i) a polyester of a hydroxy substituted carboxylic acid and at least one block derived from (ii) a polyalkylene glycol terminated by an amine group or a hydroxyl group.

2. The dispersant of claim 1 wherein the polyester of a hydroxy substituted carboxylic acid is derived from one or more carboxylic acids of formula (I):

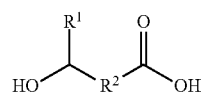

where $R^1$ is a hydrogen or a hydrocarbyl group containing from 1 to 20 carbon atoms and $R^2$ is a hydrocarbylene group containing from 1 to 20 carbon atoms.

3. The dispersant of claim 1 wherein the polyester of a hydroxy substituted carboxylic acid comprises one or more compounds represented by formula (II):

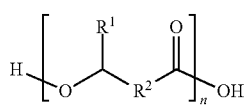

wherein:
$R^1$ is hydrogen or a hydrocarbyl group containing from 1 to 20 carbon atoms;
$R^2$ is a hydrocarbylene group containing from 1 to 20 carbon atoms; and
n is an integer from 1 to 10.

4. The dispersant of claim 1 wherein the carboxylic acid polyester is derived from one or more carboxylic acids selected from the group consisting of 12-hydroxystearic acid, ricinoleic acid, 12-hydroxy dodecanoic acid, 5-hydroxy dodecanoic acid, 5-hydroxy decanoic acid, 4-hydroxy decanoic acid, 10-hydroxy undecanoic acid, or combinations thereof.

5. The dispersant of claim 1 wherein the polyalkylene glycol comprises one or more compounds represented by formula (III):

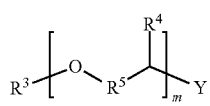

wherein:
$R_3$ is hydrogen (H), $-R_6OH$, $-R_6NH_2$, $-(C=O)R_6$, $-R_6-N(H)C(=O)R_6$, or a hydrocarbyl group of from 1 to 30 carbon atoms,
$R_4$ is H, or a hydrocarbyl group of from 1 to 10 carbon atoms,
$R_5$ is a straight or branched hydrocarbyl group of from 1 to 6 carbon atoms,
$R_6$ is a hydrocarbyl group of 1 to 20 carbon atoms,
Y is $NR_7R_8$, OH, $R_6NH_2$ or $R_6OH$,
$R_7$, and $R_8$, independently, are H, or a hydrocarbyl group of from 1 to 50 carbon atoms in which up to one third of the carbon atoms can be substituted by N or functionalized with additional polyether of formula (III), and
m is an integer from 1 to 30.

6. The dispersant of claim 1 wherein the polyalkylene glycol is a polyethylene glycol terminated by an amine group or a hydroxyl group.

7. The dispersant of claim 1 wherein the polyalkylene glycol is selected from the group consisting of (i) a polyethylene glycol, (ii) a polypropylene glycol, (iii) a mixture of polyoxyalkylene amines, or (iv) some combination thereof.

8. The dispersant of claim 1 wherein the polyalkylene glycol is selected from the group consisting of (i) triethylene glycol, (ii) diethylene (iii) a 250 to 350 molecular weight polyethylene glycol, (iv) a 200 to 350 molecular weight polytetrahydrofuran, (v) a mixture of one or more amine terminated glycols containing units derived from ethylene oxides, propylene oxides, butylene oxides or some combination thereof, or (vi) some combination thereof.

9. The dispersant of claim 1 wherein the dispersant comprises the reaction product of a polyester of a hydroxy substituted carboxylic acid derived from 12-hydroxystearic acid and a polyalkylene glycol selected from the group consisting of (i) triethylene glycol; (ii) diethylene glycol, (iii) a 250 to 350 molecular weight polyethylene glycol; (iv) a 200 to 350 molecular weight polytetrahydrofuran, (v) a mixture of one or more amine terminated glycols containing units derived from ethylene oxides, propylene oxides, butylene oxides, or some combination thereof, or (vi) some combination thereof.

10. A lubricating composition comprising an oil of lubricating viscosity and the dispersant of claim 1.

11. A method of making a lubricating composition comprising:
making a dispersant additive comprising reacting:
(i) a polyester of a hydroxy substituted carboxylic acid; a hydroxy substituted carboxylic acid; or a combination thereof, with
(ii) a polyalkylene glycol terminated by a amine group or a hydroxyl group; an alkylene oxide, or a combination thereof;
resulting in a dispersant additive whose structure includes at least one segment derived from component (i) and at least one segment derived from component (ii); and
combining the dispersant additive with an oil of lubricating viscosity.

12. The method of claim 11 wherein the method comprises the step of:
(A) reacting (i) a polyester of a hydroxy substituted carboxylic acid with (ii) a polyalkylene glycol terminated by a amine group or a hydroxyl group; or
(B) reacting (i) a hydroxy substituted carboxylic acid with (ii) a polyalkylene glycol terminated by a amine group or a hydroxyl group followed by polymerization of the hydroxyl substituted carboxylic acid; or
(C) reacting (i) a polyester of a hydroxy substituted carboxylic acid with (ii) an alkylene oxide;
resulting in a dispersant additive whose structure includes at least one segment derived from component (i) and at least one segment derived from component (ii).

13. A method of lubricating an engine comprising the step of supply a lubricating composition to the engine, wherein the lubricating composition comprises an oil of lubricating viscosity and a dispersant additive wherein the structure of the additive comprises at least one block derived from (i) a polyester of a hydroxy substituted carboxylic acid and at least one block derived from (ii) a polyalkylene glycol terminated by a amine group or a hydroxyl group.

14. A method of reducing sludge formation in an engine comprising the step of supply a lubricating composition to the engine, wherein the lubricating composition comprises an oil of lubricating viscosity and a dispersant additive wherein the structure of the additive comprises at least one block derived from (i) a polyester of a hydroxy substituted carboxylic acid and at least one block derived from (ii) a polyalkylene glycol terminated by a amine group or a hydroxyl group.

* * * * *